United States Patent [19]

Pioch

[11] 3,904,618

[45] Sept. 9, 1975

[54] 7-SUBSTITUTED CEPHALOSPORIN COMPOUNDS

[75] Inventor: Richard P. Pioch, Indianapolis, Ind.

[73] Assignee: Eli Lilly and Company, Indianapolis, Ind.

[22] Filed: Dec. 26, 1973

[21] Appl. No.: 427,949

[52] U.S. Cl......... 260/243 C; 260/330.5; 260/345.2; 424/246
[51] Int. Cl.$^2$................ C07D 501/34; A61K 31/545
[58] Field of Search................................ 260/243 C

[56] References Cited
FOREIGN PATENTS OR APPLICATIONS
44-26106   11/1969   Japan............................... 260/243 C

*Primary Examiner*—Donald G. Daus
*Assistant Examiner*—Diana G. Rivers
*Attorney, Agent, or Firm*—Charles W. Ashbrook; Walter E. Buting; Everet F. Smith

[57] ABSTRACT

A new class of cephalosporin compounds having benzopyran, benzothiopyran, and derivatives thereof, in the side chain portion of the cephalosporin molecule.

9 Claims, No Drawings

7-SUBSTITUTED CEPHALOSPORIN COMPOUNDS

BACKGROUND OF THE INVENTION

This invention relates to novel cephalosporin compounds which possess broad spectrum antibacterial activity.

The cephalosporins form a class of antibiotics which are now well known and several of which are routinely used in the treatment of infectious diseases. Research continues, however, to look for new cephalosporins which might have expanded antibacterial activity, or other desirable qualities.

SUMMARY OF THE INVENTION

The present invention is directed to compounds of the following formula

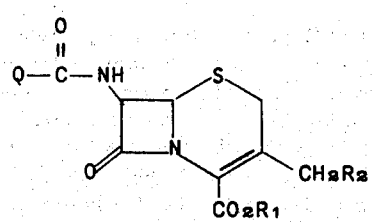

I wherein:

$R_1$ is hydrogen, a pharmaceutically acceptable cation, $C_4$ to $C_6$ t-alkyl, $C_5$ to $C_6$ t-alkenyl, $C_5$ to $C_7$ t-alkynyl, benzyl, methoxybenzyl, nitrobenzyl, benzhydryl, trichloroethyl, phenacyl or trimethylsilyl;

$R_2$ is hydrogen, $C_2$ to $C_4$-alkanoyloxy, $C_1$ to $C_4$ alkoxy or $-SR_3$ wherein:

$R_3$ is $C_1$ to $C_3$ alkyl,

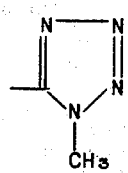 or 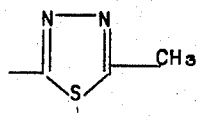

and Q is

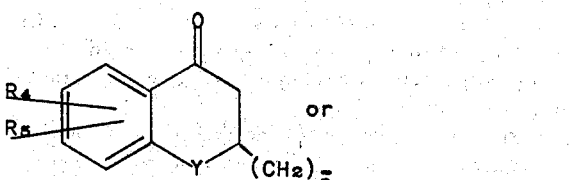 or

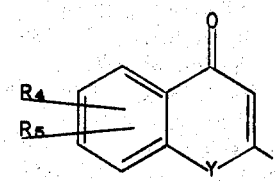

wherein:

$n$ is 0 or 1;

$R_4$ and $R_5$ independently are hydrogen, chloro, bromo, fluoro, nitro, amino, $C_1$ to $C_3$ acylamino, hydroxy, $C_1$ to $C_2$ alkyl, or $C_1$ to $C_2$ alkoxy; and Y is O, S, SO or $SO_2$.

DESCRIPTION OF THE PREFERRED EMBODIMENT

As set forth above, the present invention is directed to novel 7-acylamido cephalosporin compounds represented by formula I.

The most active compounds of the present invention are those in which $R_1$ of formula I is hydrogen or a pharmaceutically acceptable cation, i.e., the carboxylic acids or salts of the acids. The identity of the salt forming group is not of importance to the present invention, except that the salt formed must be non-toxic and pharmaceutically acceptable. Preferred carboxylate salt forms are the alkali metal salts such as lithium, sodium, or potassium. Organic salts, such as the triethylammonium, procaine, and N-ethylpiperidinium are acceptable, as well as the ammonium salt.

During the preparation of the acids, it is often desirable to protect the carboxyl group by esterification. The esterifying group is preferably one that can be readily removed to regenerate the acid. Preferred ester groups include, among others, t-butyl, t-amyl, 1,1-dimethyl-2-propenyl, 1,1-dimethyl-2-pentynyl, benzyl, p-methoxybenzyl, p-nitrobenzyl, benzhydryl, trichloroethyl, phenacyl, trimethylsilyl, and like ester forming groups. The esters so described thus form a class of intermediates for the more active carboxylic acids of the present invention. The carboxylic acid can be regenerated from an ester by any of the commonly employed methods, for example, acid- or base-catalyzed hydrolysis or enzymatic hydrolysis. Caution must be exercised during hydrolyses incorporating an aqueous solvent, for such aqueous conditions often cause isomerizations, rearrangements or degradation or reaction in other parts of the molecule. Other de-esterification methods commonly employed can also be used to regenerate the acid, including reaction with Lewis acids, e.g. trifluoroacetic acid, formic acid; reduction, e.g., zinc/acetic acid, zinc/hydrochloric acid, palladized charcoal and hydrogen; and attack by nucleophiles, e.g., alcohols, thiols and water.

With reference to the 3-substituent of the cephalosporin molecule, represented by $-CH_2R_2$ in formula I, $R_2$ can be selected to be hydrogen. $R_2$ can also be $C_2$ to $C_4$-alkanoyloxy such as acetoxy, propionoxy, n-butyroxy and isobutyroxy. When $R_2$ is selected from the group of $C_1$ to $C_4$-alkoxy, the 3-substituent becomes, for example, methoxymethyl, ethoxymethyl, n-propoxymethyl, t-butoxymethyl, and the like. When $R_2$ is selected from among the group of thiol derivatives, the 3-substituent then includes, among others, methylthiomethyl, ethylthiomethyl, isopropylthiomethyl, 1-methyl-1,2,3,4-tetrazole-5-thiomethyl, 2-methyl-1,3,4-thiadiazole-5-thiomethyl, and the like. Many such 3-functionalized-methyl cephalosporin compounds are well known in the patent literature, see for example, U.S. Pat. No. 3,641,021, U.S. Pat. No. 3,516,997 and U.S. Pat. No. 3,499,983.

In accordance with the invention, the compounds of the invention are prepared by reacting a carboxylic acid compound of formula II, or a reactive derivative thereof, $$Q - COOH$$

II with a compound of the formula III.

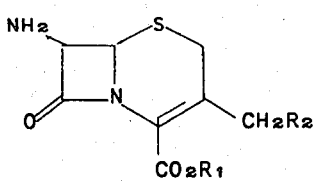

III

Preferably, a reactive derivative of the acid is reacted with a compound of formula III, wherein $R_1$ is hydrogen. Some examples of suitable reactive derivatives of the carboxylic acid compounds represented by formula II are the acid halides, especially the acid chloride, the active esters and the anhydrides, including mixed anhydrides. The preferred reactive derivatives in the present invention include the mixed anhydrides, especially the mixed anhydride obtained by the reaction of a carboxylic acid of formula II with methyl chloroformate.

In practice, it is convenient to condense a carboxylic acid compound, or its reactive derivative, with an amine of formula III. The reactants are normally employed in approximately equimolar quantities, although an excess of either can be used if desired. The reaction may be carried out in any of a number of unreactive solvents, including acetone, aqueous acetone, tertiary amides, such as N,N-dimethylformamide, and chlorinated hydrocarbons, such as dichloromethane or chloroform. The reaction medium may also contain added base to serve as an acid-binding agent, especially when an acid halide or a mixed anhydride is used as the reactive derivative of the carboxylic acid. Some suitable bases for this purpose include pyridine, triethylamine, N-methylmorpholine, and sodium bicarbonate. A preferred solvent medium for the reaction is N,N-dimethylformamide, containing as base triethylamine. The temperature and length of reaction can be varied widely depending on whether the free carboxylic acid or one of its reactive derivatives is used. When the preferred mixed anhydride is employed, the reaction is carried out at a temperature of about −20° to 30°C., and at this temperature, the reaction is substantially complete within 1 to 4 hours. The reaction is preferably conducted in such a way that the pH is held between 5 and 9 by the addition of the required amount of base or a buffer solution. The product may be isolated either as the free acid or as a carboxylate salt by suitable adjustment of the pH. In a typical procedure, the reaction mixture containing the product is dissolved in water and the aqueous solution is acidified to a pH of about 2 or 2.5. This acidic solution is extracted with ethyl acetate, for example, and the ethyl acetate solution may be evaporated to give the product in the free acid form. Alternatively, the free acid residue may be redissolved in a suitable solvent, for example, ethyl acetate or methanol, and treated with a suitable base, such as potassium 2-ethylhexanoate, followed by concentration of the solvent to precipitate a carboxylic acid salt.

An alternative method of acylation involves contacting a free carboxylic acid compound of formula II with an amine of formula III, wherein $R_1$ is an ester forming group, in the presence of a condensing agent. Suitable condensing agents include carbodiimides, for example, N,N'-diethylcarbodiimide, N,N'-diisopropylcarbodiimide, or N,N'-dicyclohexylcarbodiimide; suitable carbonyl compounds, for example, carbonyldiimidazole; or isoxazolinium salts; such as N-ethyl-5-phenylisoxazolinium-3'-sulfonate. These condensation reactions are normally conducted in an anhydrous reaction medium, for example, dichloromethane or N,N-dimethylformamide.

Another method of preparing the compounds of the present invention comprises reacting a carboxylic acid of formula II with a compound of formula IV,

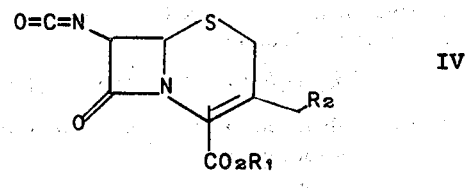

IV wherein $R_1$ and $R_2$ are as defined above, except that $R_1$ is an ester forming group, for example, trimethylsilyl.

A still further method of preparing compounds of the present invention, represented by formula I, involves reacting a compound of formula I, wherein $R_2$ is a replaceable residue of a nucleophile, such as acetoxy, with a nucleophile such as $R_3SH$, wherein $R_3$ has the above defined meaning. Many such displacement reactions are known in the patent literature, see for example U.S. Pat. No. 3,641,021.

The carboxylic acid compounds, represented by formula II, and their reactive derivatives which are required as starting materials in the preferred acylation process discussed hereinabove, are prepared by any of a variety of methods. Most of the carboxylic acid starting materials are known compounds, having been reported and described in the following: U.S. Pat. No. 2,434,100, Ann. Chem., 680, 40–51 (1964), J. Chem. Soc. (C) 2230–2233 (1970), and J. Chem. Soc. (C) 2797–2799 (1958). A preferred method of synthesis, for example, involves the cyclization with mineral acids of phenyl-thiosuccinic acids to the respective 2,3-dihydro-4-oxo-4H-1-benzothiopyran-2-carboxylic acid. The 4-oxo-4H-1-benzopyrans and 4-oxo-4H-1-benzothiopyrans are readily prepared from the respective 2,3-dihydro compounds by halogenation, preferably by chlorination or bromination, followed by dehydrohalogenation. The 4-oxo-4H-1-benzothiopyrans are readily converted to the 1-oxo and 1,1-dioxo derivatives by oxidation with a suitable oxidizing agent such as hydrogen peroxide or metachloroperbenzoic acid in the proper molar ratio to effect mono- or di-oxidation.

The reactive derivatives of the carboxylic acids may be prepared by employing general methods known in organic chemistry for converting a carboxylic acid to its functional derivatives. For example, the acid halides are prepared by reacting a given acid or a salt thereof, for example, the sodium or potassium salt, with a halogenating agent such as, for example, phosphorus pentachloride, thionyl chloride or oxalyl chloride. The preferred reactive derivatives of the carboxylic acids are the mixed anhydrides. Suitable mixed anhydrides are those prepared by reaction of a carboxylic acid with an acid such as pivalic acid or with a haloformate such as methyl chloroformate. A mixed anhydride of the carboxylic acid may be generated in situ using N-ethoxycarbonyl-2-ethoxy-1,2-dihydroquinoline.

When converting an acid of formula II into a corresponding acylating agent, it will be appreciated that any amino or hydroxy groups present in Q, wherein Q is defined above, should desirably be protected to avoid undesirable side reactions; similar protection of amino or hydroxy groups present in Q is desirable when reacting the consequent acylating agent with a compound of formula III or a compound of formula IV. Protecting groups which may be used to protect an amino group include triphenylmethyl, t-butoxycarbonyl, 2,2,2-trichloroethoxycarbonyl, 4-oxo-2-pentenyl-2, 1-carbomethoxy-1-propenyl-2, and like groups. Amino groups are thus protected by reacting an acid compound of Formula II, wherein $R_4$ or $R_5$, or both, are $-NH_2$, with a compound such as triphenylmethylchloride, t-butylazidoformate, 2,2,2-trichloroethyl chloroformate, or like groups. When the coupling reactions are completed and it is desireable to remove the amino protecting group, the protecting group is readily removed by treatment with agents such as aqueous acetic acid, trifluoroacetic acid, zinc-acetic acid, or like agents. When Q contains a hydroxyl group, the hydroxyl group may be protected by formation of an ester such as the formate, the acetate or the trichloroacetate. At the completion of the acylation step, the hydroxyl protecting group may be readily removed by hydrolysis, for example, with sodium bicarbonate.

The free acids of the present invention form carboxylate salts with any of a variety of inorganic and organic bases. Pharmaceutically acceptable carboxylate salts are formed as described above or by reacting the free acids with bases such as sodium hydroxide, sodium carbonate, sodium bicarbonate, potassium carbonate, potassium 2-ethylhexanoate, ethylamine, 2-hydroxyethylamine and procaine. The preferred carboxylate salt forms are the alkali metal salts. The preferred sodium salt is readily formed with sodium 2-ethylhexanoate. The carboxylate salts are readily converted to the free acids by acidification with dilute mineral acids such as hydrochloric acid.

The compounds of the present invention which contain one or more asymmetric carbon atoms may exist in the form of optical isomers. Both the D- and the L-isomers, as well as racemic mixtures thereof, are included within the scope of the invention. The configuration of the starting material will determine the configuration of the product.

The new 7-acylamidoceph-3-em-4-carboxylic acids, and non-toxic derivatives thereof, of the present invention inhibit the growth of both gram positive and gram negative organisms at concentrations as low as 0.2 µg/ml. These compounds have exhibited activity against staphylococci, e.g., *Staphylococcus aureus*, which are resistant to ordinary penicillins such as benzylpenicillin.

Typical examples of new 7-acylamidoceph-3-em-4-carboxylic acids, and non-toxic derivatives thereof, of the present invention are listed below:

7-(6-nitro-2,3-dihydro-4-oxo-4H-1benzothiopyran-2-ylcarboxamido)-3-acetoxymethyl-$\Delta^3$-cephem-4-carboxylic acid;

7-(6-chloro-2,3-dihydro-4-oxo-4H-1-benzopyran-2-ylcarboxamido)-3-acetoxymethyl-$\Delta^3$-cephem-4-carboxylic acid;

7-(6-chloro-2,3-dihydro-4-oxo-4H-1-benzothiopyran-2-ylcarboxamido)-3-(2-methyl-1,3,4-thiadiazol-5-thio)methyl-$\Delta^3$-cephem-4-carboxylic acid;

7-(5-methyl-8-methoxy-4-oxo-4H-1-benzothiopyran-2-ylcarboxamido)-3-methoxymethyl-$\Delta^3$-cephem-4-carboxylic acid;

7-(4-oxo-4H-1-benzothiopyran-2-ylcarboxamido)-3-acetoxymethyl-$\Delta^3$-cephem-4-carboxylic acid;

7-(4-oxo-4H-1-benzothiopyran-2-ylcarboxamido)-3-[(1-methyl-1,2,3,4-tetrazol-5-thio)methyl]-$\Delta^3$-cephem-4-carboxylic acid;

7-(4-oxo-4H-1-benzothiopyran-2-ylcarboxamido)-3-methylthiomethyl-$\Delta^3$-cephem-4-carboxylic acid;

7-(5-methyl-8-methoxy-4-oxo-4H-1-benzothiopyran-2-ylcarboxamido)-3-acetoxymethyl-$\Delta^3$-cephem-4-carboxylic acid;

7-(6-nitro-2,3-dihydro-4-oxo-4H-1-1,1-dioxobenzothiopyran-2-ylcarboxamido)-3-methyl-$\Delta^3$-cephem-4-carboxylic acid;

7-(6-bromo-2,3-dihydro-4-oxo-4H-1-benzopyran-2-ylcarboxamido)-3-acetoxymethyl-$\Delta^3$-cephem-4-carboxylic acid;

7-(6-amino-2,3-dihydro-4-oxo-4H-1-benzopyran-2-ylcarboxamido)-3-methyl-$\Delta^3$-cephem-4-carboxylic acid;

7-(6-hydroxy-4-oxo-4H-1-benzopyran-2-ylcarboxamido)-3-methyl-$\Delta^3$-cephem-4-carboxylic acid;

Sodium-7-(5-nitro-6-hydroxy-4oxo-4H-1-benzopyran-2-ylcarboxamido)-3-methylthiomethyl-$\Delta^3$-cephem-4-carboxylate;

Sodium-7-(6-amino-4-oxo-4H-1-benzopyran-2-ylcarboxamido)-3-methoxymethyl-$\Delta^3$-cephem-4-carboxylate;

Sodium-7-[(6-acetamido-2,3-dihydro-4-oxo-4H-1-benzothiopyran-2-yl)acetamido]-3-t-butoxymethyl-$\Delta^3$-cephem-4-carboxylate;

Potassium-7-[6-hydroxy-4-oxo-4H-1-benzopyran-2-ylcarboxamido]-3-methoxymethyl-$\Delta^3$-cephem-4-carboxylate.

7-(6-fluoro-2,3-dihydro-4-oxo-4H-1-1-oxo-benzopyran-2-ylcarboxamido)-3-ethylthiomethyl-$66^3$-cephem-4-carboxylic acid;

Ammonium-7-[6-ethyl-2,3-dihydro-4-oxo-4H-1-benzothiopyran-2-ylcarboxamido]-3-acetoxymethyl-$\Delta^3$-cephem-4-carboxylate;

7-(6-ethoxy-4-oxo-4H-1-benzopyran-2-ylcarboxamido)-3-acetoxymethyl-$\Delta^3$-cephem-4-carboxylic acid;

7-(6,7-dichloro-2,3-dihydro-4-oxo-4H-1-benzothiopyran-2-ylcarboxamido)-3-[(1-methyl-1,2,3,4-tetrazol-5-thio)methyl]-$\Delta^3$-cephem-4-carboxylic acid.

The antibiotic acids and salts of the present invention are useful in treating human infections. These antibiotics may be formulated for injection in single dose or multiple dose units. Alternatively, the active ingredient may be in powder form for reconstitution with a suitable vehicle, e.g., sterile water, before use.

The normal dosage unit will contain from about 50 to 500 mg. of active ingredient. The dosage as employed for adult human treatment will preferably range from 100–3000mg. per day, depending on the route and frequency of administration.

The invention is further illustrated by the following detailed examples which are intended to be illustrative only, and are not intended to limit the scope of this invention.

In the examples, the infrared absorption spectrum is abbreviated "IR." Only the significant IR absorption attributable to the carbonyl function of the β-lactam ring is given. In all cases, the spectrum was run on a Nujol Mull suspension. The inflection point of the titration curve, run in 66 percent DMF/water, is given as the $pK'a$.

EXAMPLE 1

7-(6-chloro-2,3-dihydro-4oxo-4H-1-benzothiopyran-2-ylcarboxamido)-3-acetoxymethyl-$\Delta^3$-cephem-4-carboxylic acid A solution of 2.42 g. (10 mM) of 6-chloro-2,3-dihydro-4-oxo-4H-1-benzothiopyran-2-carboxylic acid, prepared according to U.S. Pat. No. 2,434,100, in 100 cc. of dry benzene was cooled in an ice bath and stirred while 2 drops of dimethylformamide (DMF) was added. This was followed by the addition in one portion of 1.4 g. (11 mM) of oxalyl chloride. The reaction mixture was stirred at about 10° to 20°C. for about 45 minutes, then at room temperature for 2 hours. The solvent was removed under reduced pressure and the residual oil was dissolved in 50 cc. of dry acetone and added dropwise to a cold solution (about 5° to 15°C.) of 2.72 g. (10 mM) of 7-amino-3-acetoxymethyl-$\Delta^3$-cephem-4-carboxylic acid (7-ACA) in 100 cc. of 50 percent acetone:water containing 2.7 g of sodium bicarbonate. The resulting solution was stirred for 1 hour at room temperature, after which the acetone was removed under reduced pressure and 50 cc. of ethyl acetate was added. The mixture was acidified with 1N hydrochloric acid to pH 2.5 and extracted with ethyl acetate (2 × 50 cc.). The combined organic extracts were washed with 50 cc. of water, dried over magnesium sulfate, filtered and the filtrate was evaporated to give an oil. The oil was dissolved in 10 cc. of ethyl acetate, and to this solution was added a 10 percent w/v solution of sodium 2-ethyl hexanoate in 10 cc. of n-butanol.

Sodium-7-(6-chloro-2,3-dihydro-4-oxo-4H-1-benzothiopyran-2-ylcarboxamido)-3-acetoxymethyl-$\Delta^3$-cephem-4-carboxylate precipitated as a light brown solid, $pK'a$ 5.2, IR (mull) 1,760 cm$^{-1}$.

EXAMPLE 2

7-(6,7-dichloro-2,3-dihydro-4-oxo-4H-1-benzothiopyran-2-ylcarboxamido)-3-acetoxymethyl-$\Delta^3$-cephem-4-carboxylic acid A solution of 1.0 g (3.6 mM) of 6,7-dichloro-2,3-dihydro-4-oxo-4H-1-benzothiopyran-2-carboxylic acid in 10 cc. of dimethylformamide (DMF) was stirred and cooled to about −5°C. After 0.5 cc. of triethylamine and 0.28 cc. of methyl chloroformate were added, the reaction mixture was stirred for 20 minutes. To this resulting mixed anhydride solution was added a solution of 1.6 g. (5.9 mM) of 7-ACA and 1.5 cc. of triethylamine in 10 cc. of DMF. After being stirred for 1 hour in an ice bath and for 2 hours at room temperature, the reaction mixture was poured into a mixture of 50 cc. of water and 50 cc. of ethyl acetate. The mixture was cooled in an ice bath and the pH was adjusted to 2.0 with 1N hydrochloric acid. The aqueous layer was extracted with ethyl acetate (3 × 50 cc.) and the organic extracts were combined and washed with water (3 × 50 cc.) and dried over sodium sulfate. Filtration of the drying agent and evaporation of its filtrate under reduced pressure gave the desired acid as an oil. The acid was treated with sodium 2-ethylhexanoate in the manner described above to afford the sodium salt of 7-(6,7-dichloro-2,3-dihydro-4-oxo-4H-1-benzothiopyran-2-ylcarboxamido)-3-acetoxymethyl-$\Delta^3$-cephem-4-carboxylic acid, IR (mull) 1750 cm$^{-1}$.

EXAMPLE 3

7-(7-chloro-2,3-dihydro-4-oxo-4H-1-benzothiopyran-2-ylcarboxamido)-3-acetoxymethyl-$\Delta^3$-cephem-4-carboxylic acid A solution of 400 mg. (1.62 mM) of 7-chloro-2,3-dihydro-4-oxo-4H-1-benzothiopyran-2-carboxylic acid in 10 cc. of DMF was stirred and cooled to −5°C. After 0.23 cc. of triethylamine and 0.126 cc. of methyl chloroformate were added, the reaction mixture was stirred for 20 minutes. To the resulting mixed anhydride solution was added a solution of 750 mg. (2.76 mM) of 7-ACA and 0.7 cc. of triethylamine in 10 cc. of DMF. The mixture was stirred for three hours while being allowed to warm to room temperature. The reaction mixture was diluted with water, overlayered with ethyl acetate and cooled in an ice bath, and the pH was adjusted to 2.0 by the addition of 1N hydrochloric acid. The ethyl acetate layer was separated, washed with saturated sodium chloride solution, dried over anhydrous sodium sulfate, and evaporated to leave a gummy residue which was dissolved in 15 cc. of methanol and treated with sodium 2-ethyl-hexanoate. The sodium salt of 7-(7-chloro-2,3-dihydro-4-oxo-4H-1-benzothiopyran-2-ylcarboxamido)-3-acetoxymethyl-$\Delta^3$-cephem-4-carboxylic acid precipitated as white crystals, IR (mull) 1,750 cm$^{-1}$.

EXAMPLE 4

7-[2-(6-chloro-2,3-dihydro-4-oxo-4H-1-benzothiopyran-2-yl)acetamido]-3-acetoxymethyl-$\Delta^3$-cephem-4-carboxylic acid A solution of 800 mg. (3.1 mM) of 6-chloro-2,3-dihydro-4-oxo-4H-1-benzothiopyran-2-acetic acid [prepared according to F. Bossert, Ann. Chem. 680, 40–51 (1964)] in 10 cc. of DMF was stirred and cooled to −5°C. One-half cc. of triethylamine and 0.28 cc. of methyl chloroformate were added to the acid solution. The reaction mixture was stirred at −5°C. for 20 minutes, after which a solution of 1.6 g. (5.9 mM) of 7-ACA and 1.5 cc. of triethylamine in 10 cc. of DMF was added. The resulting reaction mixture was stirred and allowed to warm to room temperature over 3 hours, after which it was diluted with 50 cc. of water and layered with 50 cc. of ethyl acetate. The resulting mixture was cooled to about 10°C. and acidified to pH 2.0 with 1N hydrochloric acid. The organic layer was separated, washed with 50 cc. of water, dried over sodium sulfate and evaporated to dryness in vacuo. The residue was dissolved in 10 cc. of methanol and added to a solution of sodium 2-ethylhexanoate, 10 percent w/v in n-butanol. The sodium salt of 7-[2-(6-chloro-2,3-dihydro-4-oxo-4H-1-benzothiopyran-2-yl)acetamido]-3-acetoxymethyl-$\Delta^3$cephem-4-carboxylic acid precipitated, IR (mull) 1,765 cm$^{-1}$., $pK'_a$ 5.1.

EXAMPLE 5

7-(6-chloro-4-oxo-4H-1-benzothiopyran-2-ylcarboxamido)-3-acetoxymethyl-$\Delta^3$-cephem-4-carboxylic acid To a cold solution of 720 mg. (3.0 mM) of 6-chloro-4-oxo-4H-1-benzothiopyran-2-carboxylic acid in 10 cc. of DMF were added 0.42 cc. of triethylamine and 0.23 cc. of methyl chloroformate. This solution was stirred at about 0°C. for 20 minutes, after which a cold solution of 1.35 g. (5 mM) of 7-ACA and 1.26 cc. of triethylamine in 10 cc. of DMF was added. The reaction mixture was stirred for 3 hours while warming to room temperature, after which it was diluted with 50 cc. of water and cooled in an ice bath. Dilute hydrochloric acid was added dropwise until the pH was lowered to 2.0, at which time the crude product was extracted into ethyl acetate. The organic extracts were washed with saturated sodium chloride solutions (2 × 25 cc.), dried over sodium sulfate, and evaporated under reduced pressure to an oil. The oil so obtained was treated with sodium 2-ethylhexanoate to afford sodium-7-(6-chloro-4-oxo-4H-1-benzothiopyran-2-ylcarboxamido)-3-acetoxymethyl-$\Delta^3$-cephem-4-carboxylate, IR (mull) 1,710 cm$^{-1}$.

I claim:

1. The compound of the formula

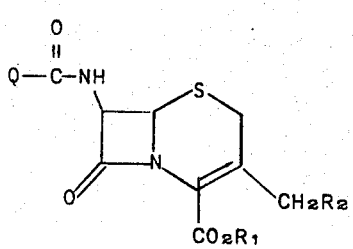

wherein:
$R_1$ is hydrogen, a pharmaceutically acceptable cation, $C_4$ to $C_6$ t-alkyl, $C_5$ to $C_6$ t-alkenyl, $C_5$ to $C_7$ t-alkynyl, benzyl, methoxybenzyl, nitrobenzyl, benzhydryl, trichloroethyl, phenacyl or trimethylsilyl;
$R_2$ is hydrogen, $C_2$ to $C_4$-alkanoyloxy or $C_1$ to $C_4$-alkoxy; and
Q is

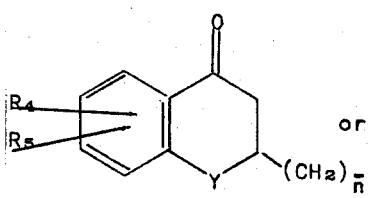

or

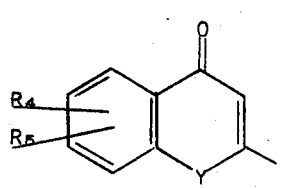

wherein:
$n$ is 0 or 1;
$R_4$ and $R_5$ independently are hydrogen, chloro, bromo, fluoro, nitro, amino, $C_1$ to $C_3$ acylamino, hydroxy, $C_1$ to $C_2$ alkyl, or $C_1$ to $C_2$ alkoxy; and
Y is O, S, SO or $SO_2$.

2. The compound of claim 1 wherein Q is

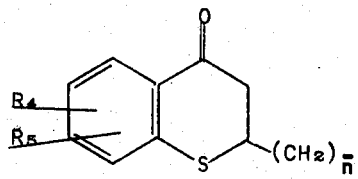

and $n$ is 0.

3. The compound of claim 2, said compound being 7-(6-chloro-2,3-dihydro-4-oxo-4H-1-benzothiopyran-2-ylcarboxamido)-3-acetoxymethyl-$\Delta^3$-cephem-4-carboxylic acid.

4. The compound of claim 2, said compound being 7-(6,7-dichloro-2,3-dihydro-4-oxo-4H-1-benzothiopyran-2-ylcarboxamido)-3-acetoxymethyl-$\Delta^3$-cephem-4-carboxylic acid.

5. The compound of claim 2, said compound being 7-(7-chloro-2,3-dihydro-4-oxo-4H-1-benzothiopyran-2ylcarboxamido)-3-acetoxymethyl-$\Delta^3$-cephem-4-carboxylic acid.

6. The compound of claim 1 wherein Q is

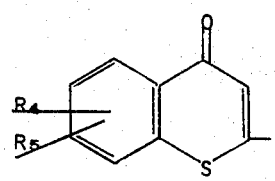

7. The compound of claim 6, said compound being 7-(6-chloro-4-oxo-4H-1-benzothiopyran-2-ylcarboxamido)-3-acetoxymethyl-$\Delta^3$-cephem-4-carboxylic acid.

8. The compound of claim 1 wherein Q is

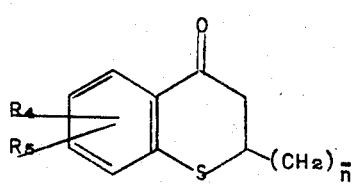

and $n$ is 1.

9. The compound of claim 8, said compound being 7-]2-(6-chloro-2,3-dihydro-4-oxo-4H-1-benzothiopyran-2yl)acetamido]-3-acetoxymethyl-$\Delta^3$-cephem-4-carboxylic acid.

* * * * *